United States Patent [19]

Connell

[11] 4,446,353
[45] May 1, 1984

[54] CENTER TRACKING WELDER UNIT WITH FLOATING REFERENCE

[75] Inventor: Talbert D. Connell, Spring, Tex.

[73] Assignee: Crutcher Resources Corporation, Houston, Tex.

[21] Appl. No.: 375,974

[22] Filed: May 7, 1982

Related U.S. Application Data

[63] Continuation-in-part of Ser. No. 114,828, Jan. 24, 1980, abandoned.

[51] Int. Cl.³ .............................................. B23K 9/12
[52] U.S. Cl. ............................ 219/125.12; 219/124.1
[58] Field of Search ........... 219/125.12, 124.1, 124.34, 219/130.21

[56] References Cited

U.S. PATENT DOCUMENTS

| | | |
|---|---|---|
| 3,021,419 | 2/1962 | Rascati et al. |
| 3,076,889 | 2/1963 | Enk |
| 3,179,786 | 4/1965 | Greene |
| 3,262,006 | 7/1966 | Sciaky et al. |
| 3,268,805 | 8/1966 | Normando |
| 3,443,057 | 5/1969 | Allen et al. |
| 3,530,359 | 9/1970 | Grist |
| 3,646,309 | 2/1972 | Smith, Jr. et al. |
| 3,777,115 | 12/1973 | Kazlauskas et al. |
| 3,783,222 | 1/1974 | Gwin et al. |
| 3,989,921 | 11/1976 | Ohi et al. |
| 4,019,016 | 4/1977 | Friedman et al. |
| 4,109,130 | 8/1978 | Oku ................................ 219/130.21 |
| 4,151,395 | 4/1979 | Kushner et al. ................ 219/125.12 |
| 4,158,124 | 6/1979 | Connell. |

Primary Examiner—C. C. Shaw
Attorney, Agent, or Firm—Richards, Harris & Medlock

[57] ABSTRACT

A floating reference voltage is generated in response to the low frequency components of weld current and is utilized in the control of the width of travel of a welding arc back and forth across a gap to be filled with weld metal. The arc current is integrated during each traverse across the gap and this integral is compared with the floating reference so that as the wall of the gap is approached, the direction of travel of the arc will be reversed. Provision is made for avoidance of the effects of "dip transfer".

11 Claims, 1 Drawing Figure

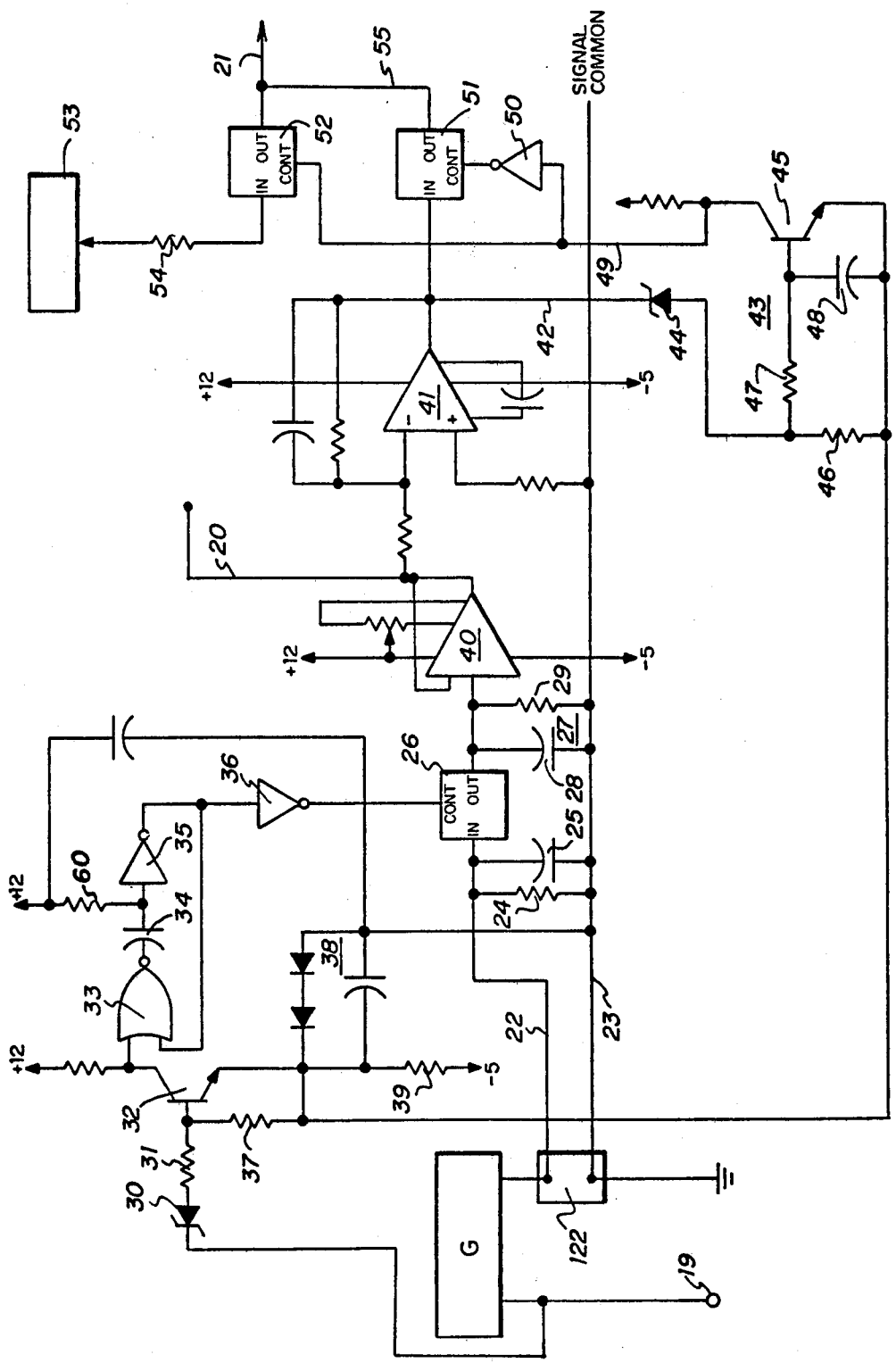

CENTER TRACKING WELDER UNIT WITH FLOATING REFERENCE

TECHNICAL FIELD

This application is a continuation-in-part of copending application for U.S. patent application Ser. No. 114,828 filed Jan. 24, 1980, now abandoned.

This invention relates to automatic welding and more particularly to the generation and utilization of a floating reference in the control of the width of travel of a welding arc back and forth across a gap to be filled with weld metal.

BACKGROUND ART

In Applicant's prior U.S. Pat. No. 4,158,124, a system is disclosed in which a welding arc is caused to weave back and forth across a gap to be filled with weld metal. In that system the arc current is integrated during each traverse across the gap and the integral of the current is compared with a reference so that as the wall of the gap is approached on a given traverse, the direction of travel of the arc will be reversed within a predetermined proximity of the sidewall. As the arc then moves back in the other direction across the gap, the arc current is again integrated and the direction of travel reversed as the arc reaches proximity to the other wall.

DISCLOSURE OF THE INVENTION

The present invention represents an improvement over the system shown in U.S. Pat. No. 4,158,124 in that means are provided for the generation of a floating reference dependent upon the current in the arc.

BRIEF DESCRIPTION OF DRAWINGS

FIG. 1 is a schematic diagram illustrating the generation and utilization of a floating point reference for the system of U.S. Pat. No. 4,158,124.

DETAILED DESCRIPTION

FIG. 1 illustrates in circuit diagram form a system for the generation and utilization of a floating point reference to be applied in the system shown in FIG. 3 of U.S. Pat. No. 4,158,124. Generally, in these figures generator G is connected to terminal 19 which represents the arc. Shunt 122 is connected at one terminal to generator G and at the other terminal to weld ground, and thus the weld current flows through the shunt 122.

In accordance with the present invention, the voltage across shunt 122, which varies in dependence upon the magnitude of the weld current, is utilized to supply a signal on line 20, FIG. 1 hereof, which leads to integrator 123 of U.S. Pat. No. 4,158,124, and to supply on line 21, FIG. 1 hereof, either a fixed reference or a floating reference which is applied to one terminal of comparator 126 of U.S. Pat. No. 4,158,124. In generating the signal applied to the integrator by way of line 20, provision is made for avoidance of the effects of a phenomenon known as the "dip transfer". Thus, the system of the present invention performs new functions, including: (a) avoiding dip transfer effects; (b) providing the generation of a floating point reference; and (c) interrelating the system for start-up based upon a fixed reference.

Referring now in detail to FIG. 1 hereof, lines 22 and 23 are connected by way of a filter comprised of resistor 24 and capacitor 25 to a sample-and-hold circuit 27 which comprises switch 26, capacitor 28, resistor 29 and buffer amplifier 40. It will be noted that conductor 23 is at ground or a common reference point. The switch 26 is operated in such a manner that the weld current input is applied to capacitor 28 when there is no dip transfer. More particularly, and characteristic of consumable arc welding, the tip of the consumable electrode periodically, at a rate, for example, of about 100 Hz, makes contact with the molten pool, thus placing an abrupt repeated or periodic load on generator G. Normally, generator G will produce an arc voltage of the order of 15-28 volts. However, when there is a contact of the welding wire with the molten batch, the added load causes the voltage at the electrode 19 to decrease to a lower voltage, for example, to around 3 to 5 volts. Switch 26 is operated as to be conductive only when the welding tip is not in contact with the molten pool.

The dip transfer effects are eliminated by supplying a voltage from generator G through Zener diode 30 and resistor 31 to the input of a transistor 32. The collector of transistor 32 is connected by way of NOR gate 33, capacitor 34, inverter 35 and inverter 36 to the control input of switch 26. The circuit involving transistor 32 renders switch 26 conductive so long as the arc voltage is above a threshold level, for example, above 10 to 15 volts. Switch 26 is rendered non-conductive when the voltage at the electrode drops below said threshold. The emitter circuit of transistor 32 includes resistor 37 connected to the base, the circuit 38 leading to reference line 23 and resistor 39 leading to a supply terminal 23.

The circuit comprising gate 33, resistor 60, capacitor 34 and inverter 35 serves to delay rendering switch 26 conductive following recovery of the voltage from generator G to its high level. This avoids the effects of the current build-up, which might otherwise affect the integration voltage if switch 26 were rendered conductive immediately upon change in the voltage level of generator G.

The output of buffer amplifier 40 is a function of the weld current minus the excursions caused by dip transfer, and is applied by way of conductor 20 to the integrator system 123 of U.S. Pat. No. 4,158,124, more particularly through resistor 124a of FIG. 3 of said patent. The output voltage from buffer amplifier 40 is also applied to a filter amplifer 41, providing filtering having a low frequency roll-off, for example, at about 0.3 Hz and providing amplification of the signal level by a factor, for example, of about 200. The output of filter amplifier 41 is a function of weld current minus dip transfer mode components and high frequency components.

The output of amplifier 41 is applied by way of conductor 42 to a transfer switch circuit 43 comprised of a Zener diode 44 and a transistor 45 having in its base circuit a resistor 46 connected between diode 44 and resistor 37. Resistor 47 is connected between diode 44 and resistor 37. Resistor 47 is connected between diode 44 and resistor 46 to the base of transistor 45. Capacitor 48 is connected between the base and the emitter of transistor 45. The collector of transistor 45 is connected by way of line 49 and through inverter 50 to the control input of a switch 51, and is connected directly, without inversion, to the control input of a second switch 52. A fixed reference 53 is connected by way of resistor 54 to the input of switch 52.

The output of amplifier 41 is connected to the input of switch 51. The output of amplifier 41 represents a filtered average of the weld current during such time as the voltage from generator G is at its high level, which, because of the operation of gate 26, is rendered free from the effect of operation of the welding unit in the dip transfer mode.

The output of gate 51 is connected by way of conductor 55 to the output conductor 21 which leads to the level control for the integrator. More particularly, conductor 21 is connected directly to the upper end of the potentiometer resistor 128 in FIG. 3 of U.S. Pat. No. 4,158,124. By means of switches 51 and 52, the operation of the system is automatically switched from the start-up condition where the fixed reference from source 53 is effective (switch 52 conductive and switch 51 non-conductive) to the run condition with the floating reference from amplifier 41 effective (switch 51 conductive and switch 52 non-conductive). Once the system is started up and the conductivity of transistor 45 is switched by reason of a build-up of a voltage across the capacitor 48, then during the remainder of the operation, switch 51 is conductive and switch 52 is nonconductive.

It is recognized that various alternatives and modifications are possible within the scope of the invention.

I claim:

1. In the method of controlling movement of a welding torch device along a weld line in consumable electrode type arc welding where the welding torch is to weave along the weld line and wherein the weld current is integrated and compared against a reference for reversing the weaving direction when the integral of the weld current reaches a predetermined relation with respect to the reference, the improvement which comprises generating a floating reference voltage in response to the low frequency components of said weld current and reversing the direction of travel of the arc when said integral bears said predetermined relation to said floating reference voltage.

2. The method of claim 1 wherein the voltage utilized in said integration is interrupted in response to switching to the dip transfer mode of said arc welding.

3. In apparatus for controlling movement of a welding torch device along a weld line in consumable electrode type arc welding where a welding torch weaves along the weld line and including means for integrating and comparing the weld current against a reference such that the weaving direction is reversed when the integral of the weld current reaches a predetermined relation with respect to the reference, the improvement comprising:
floating reference means generating a floating reference voltage in response to the low frequency components of said weld current such that said weaving direction is reversed when said integral bears said predetermined relation to said floating reference voltage.

4. The apparatus of claim 3 further comprising: interruption means eliminating dip transfer mode components from said weld current prior to said integration.

5. The apparatus of claim 4 wherein the output of said interruption means is delivered to said integrating means and also to said floating reference means, such that the output of said floating reference means is a function of weld current minus dip transfer mode components and high frequency components.

6. In apparatus for controlling movement of a welding torch device along a weld line in consumable electrode type arc welding where a welding torch weaves along the weld line the combination comprising:
means for integrating and comparing the integral of weld current against a reference signal representative of the average value of low frequency component of weld current to reverse the weaving direction when the integral of the weld current reaches a predetermined relation with respect to the reference, and
interruption means for eliminating dip transfer mode components from said weld current prior to said integration.

7. The apparatus of claim 6 wherein said interruption means comprises:
sensor means responsive to dip transfer mode operation of said apparatus; and
switch means gated by said sensor means to interrupt the flow of current utilized in said integration.

8. The apparatus of claim 7 further comprising:
a high frequency filter connected to the input of said switch means; and
sample-and-hold means connected to the output of said switch means.

9. The apparatus of claim 8 further comprising:
buffer means in said sample-and-hold means.

10. In the method of controlling movement of a welding torch along a weld groove in consumable electrode type arc welding where the welding torch is to weave back and forth as it travels along said groove, the improvement comprising:
(a) integrating the weld current during each traverse across said groove to produce an integral signal;
(b) generating a floating reference signal in response to low frequency components of said weld current;
(c) comparing said integral signal and said reference signal to produce a control signal; and
(d) utilizing said control signal to control the reversals of the direction of travel of said torch.

11. In apparatus for controlling a welding torch as it travels along a weld groove in consumable electrode type arc welding where a welding torch weaves back and forth as it travels along said groove, the combination comprising:
(a) means for integrating the weld current during each traverse across said groove to produce an integral voltage;
(b) reference means for generating a reference voltage in response to the low frequency components of said weld current;
(c) means for comparing said integral voltage and said reference voltage to produce a control voltage; and
(d) means for utilizing said control voltage for reversals in the direction of travel of said torch.

* * * * *

UNITED STATES PATENT AND TRADEMARK OFFICE
CERTIFICATE OF CORRECTION

PATENT NO. : 4,446,353

DATED : May 1, 1984

INVENTOR(S) : Talbert D. Connell

It is certified that error appears in the above-identified patent and that said Letters Patent is hereby corrected as shown below:

Column 2, line 21, after "35" insert --,--.

Column 2, line 29, after "23" insert --,--.

Column 2, line 42, after "4,158,124," delete "more".

Column 2, line 43, delete "particularly".

Column 2, line 55, "and" should be --in--.

Column 2, line 56, after "connected" insert --in series--.

Column 2, delete lines 53-60 and insert the following therefore:

--The output of amplifier 41 is applied by way of conductor 42 to a transfer switch circuit 43 comprised of a Zener diode 44 in a transistor 45, having in its base circuit

UNITED STATES PATENT AND TRADEMARK OFFICE
CERTIFICATE OF CORRECTION

PATENT NO. : 4,446,353            Page 2 of 2

DATED : May 1, 1984

INVENTOR(S) : Talbert D. Connell

It is certified that error appears in the above-identified patent and that said Letters Patent is hereby corrected as shown below:

a resistor 46, connected in series between diode 44 and resistor 37, and resistor 47, connected in series between the junction of both Zener diode 44 and resistor 46 and the base of transistor 45. Capacitor 48 is connected between the base and the emitter of--.

Claim 3, line 1, before "apparatus" insert --the--.

Claim 6, line 3, change "a" to --the--.

Signed and Sealed this

Ninth Day of October 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,446,353

DATED : May 1, 1984

INVENTOR(S) : Talbert D. Connell

It is certified that error appears in the above-identified patent and that said Letters Patent is hereby corrected as shown below:

Column 2, line 21, after "35" insert --,--.

Column 2, line 29, after "23" insert --,--.

Column 2, line 42, after "4,158,124," delete "more".

Column 2, line 43, delete "particularly".

Column 2, delete lines 53-60 and insert the following therefore:

--The output of amplifier 41 is applied by way of conductor 42 to a transfer switch circuit 43 comprised of a Zener diode 44 in a transistor 45, having in its base circuit

UNITED STATES PATENT AND TRADEMARK OFFICE
CERTIFICATE OF CORRECTION

PATENT NO. : 4,446,353
DATED : May 1, 1984
INVENTOR(S) : Talbert D. Connell

It is certified that error appears in the above-identified patent and that said Letters Patent is hereby corrected as shown below:

a resistor 46, connected in series between diode 44 and resistor 37, and resistor 47, connected in series between the junction of both Zener diode 44 and resistor 46 and the base of transistor 45. Capacitor 48 is connected between the base and the emitter of--.

Claim 3, line 1, before "apparatus" insert --the--.
    Claim 6, line 3, change "a" to --the--.

This certificate supersedes certificate of correction issued October 9, 1984.

Signed and Sealed this

Twenty-second Day of October 1985

[SEAL]

Attest:

Attesting Officer

DONALD J. QUIGG

Commissioner of Patents and Trademarks—Designate